United States Patent [19]

Finlay et al.

[11] 4,115,481

[45] Sep. 19, 1978

[54] FLUOROELASTOMER BLEND COMPOSITION

[75] Inventors: Joseph Burton Finlay; Hisanori Omura, both of Wilmington, Del.

[73] Assignee: E. I. Du Pont de Nemours and Company, Wilmington, Del.

[21] Appl. No.: 834,055

[22] Filed: Sep. 16, 1977

[51] Int. Cl.² .................. C08L 27/16; C08L 27/10
[52] U.S. Cl. ............................. 260/900; 260/42.27
[58] Field of Search ........................................ 260/900

[56] References Cited

U.S. PATENT DOCUMENTS

| | | |
|---|---|---|
| 3,723,577 | 3/1973 | Stivers .................................. 260/900 |
| 3,929,934 | 12/1975 | Moore et al. ......................... 260/884 |
| 3,987,126 | 10/1976 | Brodoway ............................ 260/884 |
| 4,035,565 | 7/1977 | Apotheker et al. .................. 526/249 |

*Primary Examiner*—Carman J. Seccuro

[57] ABSTRACT

A curable fluoroelastomer blend comprising:

(a) 5-90 weight percent of a non-crosslinked fluoroelastomer comprising a copolymer of vinylidene fluoride and at least one other fluoroolefin, and (b) 10-95 weight percent of a partially crosslinked fluoroelastomer comprising a copolymer of vinylidene fluoride, at least one other fluoroolefin, and about 0.5–3.0 weight percent of bromotrifluoroethylene.

6 Claims, No Drawings

FLUOROELASTOMER BLEND COMPOSITION

BACKGROUND OF THE INVENTION

This invention relates to peroxide-curable fluoroelastomer blends, in particular, to peroxide-curable fluoroelastomer compositions capable of being processed in an extruder or rubber mill.

Prior art fluoroelastomer compositions in many cases are difficult to process in rubber mills and extruders. For example, some of the commonly-used compositions are too soft and sticky on the mill or calender rolls and extrude poorly. Other fluoroelastomer compositions recommended to overcome these deficiencies require components such as divinyl ethers which are not commercially available and which are difficult and expensive to synthesize. In addition, such compositions are not peroxide-curable. Thus, the industries which manufacture and use fluoroelastomer compositions are in need of a peroxide-curable fluoroelastomer composition which can be shaped efficiently and accurately by means of an extruder, which can easily be processed on a rubber mill, and which utilize components which are commercially available and are readily synthesized.

SUMMARY OF THE INVENTION

The fluoroelastomer blend of the present invention comprises (a) about 5-90 (preferably 10-80 and most preferably 10-20) percent by weight of a non-crosslinked fluoroelastomer comprising a copolymer of vinylidene fluoride and at least one other fluoroolefin, and (b) about 10-95 (preferably 20-90 and most preferably 80-90) percent by weight of a partially crosslinked fluoroelastomer comprising vinylidene fluoride, at least one other fluoroolefin, and about 0.5-3.0 weight percent of bromotrifluoroethylene.

DETAILED DESCRIPTION OF THE INVENTION

The non-crosslinked fluoroelastomer component of the present extrudable composition can be any vinylidene fluoride copolymer elastomer whose gel content is about 0-5 percent. Among the most useful non-crosslinked fluoroelastomers are copolymers of vinylidene fluoride and hexafluoropropylene or pentafluoropropylene; copolymers of vinylidene fluoride, tetrafluoroethylene and hexafluoropropylene or pentafluoropropylene; and copolymers of vinylidene fluoride, hexafluoropropylene, and a perfluoroalkyl perfluorovinyl ether.

In preparing the non-crosslinked fluoroelastomer, one skilled in the art will be able to select the proportion of ingredients and reaction conditions for the copolymerization reaction which will result in a vinylidene fluoride copolymer which is an elastomer. It is shown in ASTM Special Publication No. 184 that an elastomer is a substance that can be stretched at room temperature to at least twice its original length, and after having been stretched and the stress removed, returns with force to approximately its original length in a short time. The following publications teach how to prepare highly soluble fluoroelastomers (having little or no crosslinking): U.S. Pat. Nos. 2,968,649; 3,136,745; 3,163,628; 3,235,537; 3,331,823; 3,335,106 and 3,579,474. A latex of a non-crosslinked fluoroelastomer can thus be prepared by carrying out the copolymerization reaction in an aqueous medium. In addition, the fluoroelastomer can be isolated from the latex by coagulation and filtration, such as illustrated in U.S. Pat. Nos. 3,536,683 and 3,598,794.

The preparation of the partially crosslinked fluoroelastomer component of the present invention is preferably conducted so that the product of the copolymerization reaction is crosslinked to such an extent that its gel content is about 50-65%. The gel content is determined as follows: a solution-dispersion of a known concentration (about 1% polymer) in 2-butanone is placed in a closed centrifuge tube and centrifuged at about 17000 rpm for ½ hour. The concentration of polymer in the supernatant liquid is determined by evaporation of dryness of a known volume. The amount of gel polymer is calculated from the difference in concentration of total polymer and concentration of polymer in the soluble portion. Alternatively, gel content can often be determined by filtration of a 2-butanone solution-dispersion through a paper filter and evaporation of the filtrate to dryness to determine the concentration of soluble polymer.

In a particular application, if the crosslinked fluoroelastomer is not crosslinked to such a degree (as measured by the above test) that it gives the desired amount of improvement in processing (e.g., milling or extruding) properties of the blended composition, it is advisable to increase the degree of crosslinking, for example by increasing the proportion of bromine copolymerized bromotrifluoroethylene.

The partially crosslinked fluoroelastomer obtained from the copolymerization reaction usually contains polymerized units of the monomers used in a molar ratio about equal to the ratio of monomers present in the reaction mixture.

The partially crosslinked fluoroelastomer is preferably prepared as a latex by carrying out the copolymerization reaction in an aqueous medium. This can be done by using substantially the same aqueous polymerization methods known to be useful for preparing the non-crosslinked fluoroelastomer discussed above.

The partially crosslinked fluoroelastomer is a copolymer whose interpolymerized units consist essentially of (a) up to 3 weight %, based on the total weight of components (a) and (b), of units derived from bromotrifluoroethylene, with the proviso that enough of such units are present to provide at least 0.05 weight % bromine in the copolymer, and (b) vinylidene fluoride, at least one fluorine-containing olefin copolymerizable therewith, and optionally a perfluoroalkyl perfluorovinyl ether, said olefin being a compound which contains 2-7 carbon atoms, contains no bromine atom, and contains at least as many fluorine atoms as carbon atoms.

Regarding the partially crosslinked fluoroelastomer described above, it is preferred that enough of the component (a) units are present in the copolymer to provide about 0.3-1.5 weight % bromine in the copolymer. It will be noted that items (a) and (b) are components in the sense that they are ingredients (in copolymerized form) of the fluoropolymer.

The copolymer is preferably a fluoroelastomer wherein component (b) is composed of units derived from any one of the following three combinations:

vinylidene fluoride and hexafluoropropylene or pentafluoropropylene;

vinylidene fluoride, tetrafluoroethylene and hexafluoropropylene or pentafluoropropylene; or vinylidene fluoride, said perfluoroalkyl perfluorovinyl ether, and at least one member of the group: hexafluoropropylene and tetrafluoroethylene.

In such embodiments, component (b) can, for example, be composed of about 30–70% vinylidene fluoride units and about 30–70% hexafluoropropylene units (units derived from these compounds) based on the weight of component (b). Or, component (b) can be composed of about 25–70 weight % vinylidene fluoride units, about 19–60 weight % hexafluoropropylene units and about 3–35 weight % tetrafluoroethylene units. Or component (b) can be composed of units derived from (on a weight % basis) about 4–15% of tetrafluoroethylene, about 48–65% of vinylidene fluoride, about 8–23% of hexafluoropropylene and about 17–30% of a perfluoroalkyl perfluorovinyl ether wherein the alkyl group contains 1–5 carbon atoms. Or component (b) can be composed of units derived from (on a mole % basis) about 10–85% vinylidene fluoride, about 2–50% of said perfluoroalkyl perfluorovinyl ether and about 3–80% of a component consisting of one or more of the following: hexafluoropropylene and tetrafluoroethylene. One can also use chlorotrifluoroethylene as the fluorine-containing olefin of component (b-3).

In preparing the partially cross-linked fluoroelastomer, it is preferred that the reaction mixture of monomer components also contains a free-radical initiator, and the copolymer-forming reaction is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as sodium lauryl sulfate or ammonium perfluorooctanoate. The surfactant can be selected from those known to be useful in the manufacture of fluoropolymers. A surfactant can of course also be present when using an inorganic initiator. A suitable known chain transfer agent can also be present during the emulsion polymerization reaction, but in many cases this is not preferred.

After completion of the preferred emulsion polymerization reaction, the copolymer can be isolated from the resulting polymer latex by known methods, for example by coagulation by adding an electrolyte or by freezing, followed by centrifuging or filtering and then drying the copolymer.

During preparation of the copolymer, the reaction mixture is preferably heated in a reactor which has been flushed with an inert gas at about 50°–130° C. under superatmospheric pressure, for example under a pressure of about 7–140 kg./cm.$^2$, preferably about 35–105 kg./cm.$^2$. In some of the most useful procedures, the polymerization is carried out as a continuous process and the reaction mixture has an average residence time in the reactor of about 5 to 30 minutes in some cases and up to 2 or 3 hours in others. Residence time can be calculated by dividing the reactor volume by the volume of latex produced per hour.

Further details concerning the preparation and formulation of the partially crosslinked fluoroelastomer can be found in U.S. Pat. No. 4,035,565.

A fluoroelastomer composition of the present invention having desirable extruder and mill processing properties can be prepared by mixing a latex of the partially crosslinked fluoroelastomer with a latex of the non-crosslinked fluoroelastomer, and isolating the blended fluoroelastomer of the latex mixture. The latex mixture is prepared from a sufficient amount of each latex so that the blended fluoroelastomer has a crosslinked fluoroelastomer content of about 10–50 percent and a non-crosslinked fluoroelastomer content of about 50–90% based on the combined weight of the two different elastomers.

The latex mixture itself can be considered as a useful article of commerce since it can be shipped to the plants of customers who will blend it with various additives or subject it to certain processes which will convert it into final products such as coating compositions, extruded articles or molded or laminated products.

The present composition can also be prepared by mixing the two different fluoroelastomers on a rubber mill or while they are in the form of solid particles (e.g. wet or dry crumb) or in the form of a dispersion in an organic liquid.

Before the fluoroelastomer composition of this invention is formed into shaped structures by extrusion or molding it is usually preferred to mix it with various additives which include metal oxides, crosslinking agents, unsaturated coagents, accelerators, stabilizers, pigments, pore-forming agents and plasticizers.

When the major component of the composition of this invention is the crosslinked copolymer containing bromotrifluoroethylene, the final composition preferably contains a metal oxide or hydroxide, a peroxide crosslinking agent, an unsaturated coagent and carbon black. Curing recipes of this type are well known in the art and are described in more detail in U.S. Pat. No. 4,035,565.

When the major component of the composition of this invention is the non-crosslinked soluble fluoroelastomer, the final composition preferably contains curing ingredients well known to be applicable to such elastomers. In some of the best embodiments of the composition, a hydroxylic aromatic compound is employed as the crosslinking agent. Useful known accelerators include certain quaternary phosphonium compounds, quaternary ammonium compounds and guanidine compounds; see U.S. Pat. Nos. 3,655,727; 3,686,143 and 3,712,877 and French Patent No. 71-20887.

Hydroxylic aromatic compounds suitable for use in a curing system for fluoroelastomers, and the amount to be used, are well known in the art. Some of the most useful compounds, including various bisphenols and hydroquinones, are described in U.S. Pat. No. 3,686,143 issued to Bowman (column 2, line 48 to column 3 line 51). One can also use the oxidizable aromatic hydroxy compounds mentioned in U.S. Pat. Nos. 3,655,727 and 3,712,877 issued to Patel et al, as well as esters of hydroxylic aromatic compounds.

In making up the present composition, the above-described curing ingredients can be replaced or combined with other known fluoroelastomer curing ingredients or other known additives for fluoroelastomer compositions, such as those mentioned in the patents referred to above.

As indicated above, the partially crosslinked fluoroelastomer of the present invention has utility for the manufacture of extrudable fluoroelastomer compositions. The extrusion operation can be carried out in an extruder of the type commonly used for processing fluoroelastomers wherein the heat and pressure conditions are sufficient to form the material into a fused-together compact mass. The milling performance of non-crosslinked fluoroelastomers can also be improved for certain applications by blending therewith some of the present partially crosslinked fluoroelastomer. Because of the presence of the crosslinked fluoroelastomer, the composition is more easily and efficiently processed in a rubber mill. The novel fluoroelastomer composition is obtainable according to this invention which is capable of being formed into shaped products efficiently and accurately by means of an extruder.

The following examples illustrate the invention; all amounts are by weight unless otherwise indicated.

EXAMPLE 1

A partially crosslinked polymer (A) was prepared by continuous emulsion polymerization in a stirred 2 liter autoclave maintained at 105° C., 900 psig, with a latex residence time of 20 minutes in the reactor, using as the free radical initiator, 28 mmol of ammonium persulfate per 100 g of polymer produced, and with monomer feeds of 560 g of vinylidene fluoride, 440 g of hexafluoropropylene, 18.7 g of bromotrifluoroethylene. Conversion of total monomers to polymer was 91%. The latex was coagulated by addition of potassium aluminum sulfate, the resulting crumb then being washed with water several times and dried at about 60° C. in a circulation air oven. The dried copolymer comprised 58.6% vinylidene fluoride, 39.4% hexafluoropropylene, and 2.05% bromotrifluoroethylene. The polymer had a gel content of 62% as determined by filtration of a 0.1% solution in 2-butanone, and 61.5% as determined by a method based on high-speed centrifugation of a dilute solution in the same solvent. The inherent viscosity (30° C., 0.2 g or 1.0 g per 100 ml 2-butanone) of the sol portion was 0.20. The Mooney viscosity, ML, 100° C., 1+10 min. of the whole polymer was 38.

EXAMPLE 2

A soluble vinylidene fluoride-hexafluoropropylene copolymer (B) was similarly prepared using monomer flows per hour of 1150 g vinylidene fluoride and 850 g hexafluoropropylene, an ammonium persulfate addition rate of 14.4 mmoles per kg polymer formed and continuously adding 22.5 mmoles 1,2-dibromotetrafluoroethane per kg monomers. The residence time in the reactor was nominally 15 minutes and monomer conversion was 90.2%. The resulting isolated polymer was 61.7 wt % vinylidene fluoride, 38.3 wt % hexafluoropropylene. It had a Mooney viscosity, ML, 100° C., 1+10 min. of 36.5.

EXAMPLE 3

Portions of the above partially crosslinked polymer A and non-crosslinked polymer B were blended with each other while in the latex form, the blend then being isolated as usual, giving blend polymer C, comprising 20.1 wt % polymer A and 79.9 wt % polymer B, and blend polymer D, comprising 40.1 wt % polymer A and 59.9 wt % polymer B. The Mooney viscosities, ML, 100° C., 1+10 min., of blends C and D were 38.5 and 40.0, respectively.

Thus, the polymer A, the polymer B, and blends C and D, all had bulk viscosities which were very similar.

EXAMPLE 4

Before compounding, the polymers A, B, C and D were compared in a piston rheometer, 1-inch diam. piston, 1/8 in. diam. die, die length to diameter ratio 2, temperature 120° C., at a series of extrusion rates. Results at a piston rate of 0.5 g/in were as follows:

| Polymer | % Polymer A | Force lbs. | "Die Swell" g/in* |
|---|---|---|---|
| B | 0 | 22.5 | 0.90 |
| C | 20 | 29.0 | 0.73 |
| D | 40 | 34.0 | 0.58 |
| A | 100 | 50.0 | 0.44 |

*in the absence of swell, the extrudate would weight 0.37 g/in.

The great improvement in die swell at even the lowest polymer A content is apparent. At higher rates, the effect on die swell would have been greater.

EXAMPLE 5

Polymers A, B, C and D were compounded with 30 phr MT Black and 1 phr Maglite D and extruded through a 2-inch Royle extruder equipped with a 1.0-inch tube die having a 0.75-inch pin. A perfect tube would thus have an external diameter 1.0 inch, an internal diameter of 0.75 inch, and be perfectly round. The extruder zone temperatures (° C.) used in this experiment were: feed 65°, barrel 88°, head 100°, die 120°, screw 80°. The screw speed was 35 r.p.m. The extruded tubes were placed immediately on a cool surface and not subsequently moved. The interior dimensions of the tube were determined after the tubes had cooooled and become sufficiently firm that no further deformation would occur.

| Polymer | % Polymer A | Interior Dimensions inches | Collapse Resistance Appearance |
|---|---|---|---|
| B | 0 | 1.35 × 0.32 | severe collapse |
| C | 20 | 1.12 × 0.53 | moderate collapse |
| D | 40 | 0.82 × 0.60 | slight collapse |
| A | 100 | 0.72 × 0.65 | very slight collapse |

EXAMPLE 6

Additional polymers F–I having bromotrifluoroethylene contents from 2.2% to 3.3% were prepared in a manner similar to that described for polymer A, varying the feed rate of bromotrifluoroethylene. These polymers were mill-blended with a soluble 60% VF$_2$, 40% hexafluoropropylene copolymer, E, made as described for polymer B, and having a Mooney viscosity, ML, 100° C., 1+10 min. of 37. The blends were compared to the all sol polymer in a composition having 30 phr MT black, 3 phr "Maglite" D, 6 phr calcium hydroxide. For a comparison test, the compounds were extruded through a ⅛-inch die using the 2-inch Royle extruder at the zone temperatures and screw revolution rate described above. Die swell at a standardized extrusion rate of 400 g/min. was determined. The results show

| Polymer | % BTFE in gel. | Die Swell (g/in)* at 400 g/min. extrusion rate |
|---|---|---|
| E | all sol control | 0.80 |

| Polymer | % BTFE in gel. | Die Swell (g/in)* at 400 g/min. extrusion rate |
|---|---|---|
| 60E/40F | 2.2 | 0.70 |
| 60E/40G | 2.3 | 0.73 |
| 60E/40H | 3.0 | 0.68 |
| 60E/40I | 3.3 | 0.71 |

*in the absence of die swell, the extrudate would weigh about 0.37 g/in.

that die swell was improved to about the same extent by addition of any of these gel polymers.

EXAMPLE 7

High gel polymer blends prepared as described in the Examples above but using "Viton" A-HV as the non-crosslinked component and formulated in the following table were extruded through a Garvey Die in accordance with ASTM D-2330 and through a 2-inch Royle extruder equipped with a ⅜ inch tube die having a ¼ inch pin. The extruder zone temperatures (° C.) used in this experiment were: Feed 52°, barrel 65°, head 77°, screw 40°, die 100°. The screw speed was 35 rpm. The extruded tubes were placed immediately on a cool surface and not subsequently moved. Data from the Garvey Die and the Royle extruder is summarized below.

| | 40A | 40B | 38B | 38C | 40C |
|---|---|---|---|---|---|
| Gel | 100 | 80 | 80 | 0 | 50 |
| Sol ("Viton" A-HV) | 0 | 20 | 20 | 100 | 50 |
| MT Black | 30 | 30 | 30 | 30 | 30 |
| Lead Oxide | 3 | 3 | 3 | — | 3 |
| Magnesium oxide | — | — | — | 5 | — |
| Triallylisocyanurate | 2.5 | 2.5 | 2.5 | 3 | 2.5 |
| "Luperco" 130 XL | 2.5 | 2.5 | 2.5 | — | 2.5 |
| "Luperco" 101 XL | — | — | — | 3 | — |
| "Vitax" processing Aid | 2 | 2 | 2 | 2 | 2 |
| Garvey Die | | | | | |
| Profile (edge) | 4 | 8 | | | |
| Surface | A | A | | | |
| Die Swell (g/in) | 3.57 | 3.31 | | | |
| Rate (g/min) | 379 | 400 | | | |
| Tube Die | | | | | |
| Surface | | | smooth | rough | smooth |
| Die swell | | | 3.55 | 4.63 | 3.63 |
| Rate | | | 628 | 587 | 461 |

We claim:
1. A fluoroelastomer blend comprising:
   (a) 5–90 weight percent of a non-crosslinked fluoroelastomer comprising a copolymer of vinylidene fluoride and at least one other fluoroolefin, and
   (b) 10–95 weight percent of a partially crosslinked fluoroelastomer comprising vinylidene fluoride, at least one other fluoroolefin and about 0.5–3.0 mole percent of bromotrifluoroethylene.
2. A fluoroelastomer blend of claim 1 wherein the non-crosslinked fluoroelastomer comprises 10–80 weight percent of the blend.
3. A fluoroelastomer blend of claim 1 wherein the non-crosslinked fluoroelastomer comprises 10–20 weight percent of the blend.
4. A fluoroelastomer blend of claim 1 wherein component (a) contains tetrafluoroethylene.
5. A fluoroelastomer blend of claim 1 wherein component (a) contains hexafluoropropylene.
6. A fluoroelastomer blend of claim 1 wherein component (b) has an insolubility value of about 50–65%.

* * * * *